Dec. 12, 1950  S. GUARNASCHELLI  2,534,199
THREADLESS TUBE COUPLING
Filed May 16, 1947
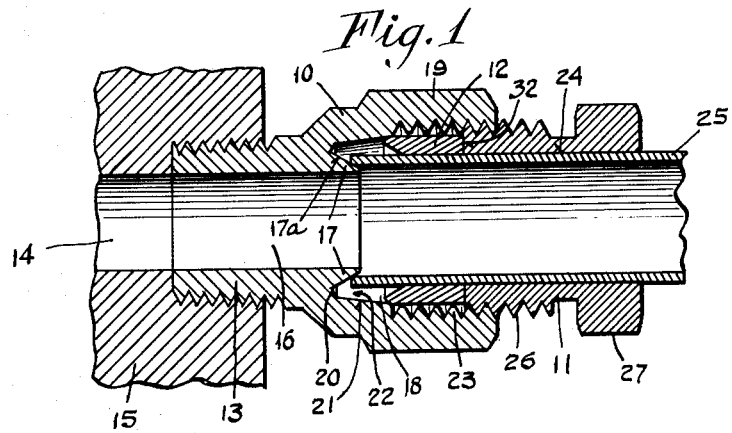
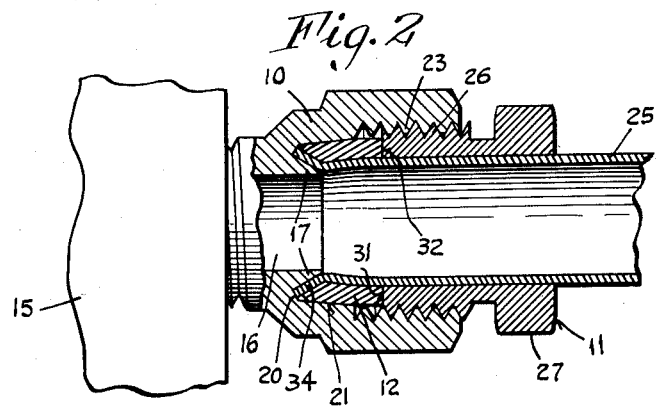
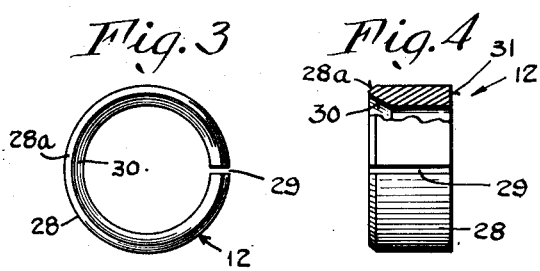
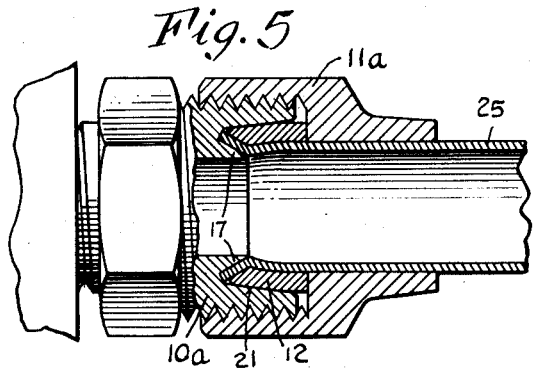
INVENTOR.
Stephen Guarnaschelli
BY
Johnson and Kline
ATTORNEYS

Patented Dec. 12, 1950

2,534,199

UNITED STATES PATENT OFFICE 2,534,199

THREADLESS TUBE COUPLING

Stephen Guarnaschelli, Naugatuck, Conn., assignor to The Brockway Company, Naugatuck, Conn., a corporation of Connecticut Application May 16, 1947, Serial No. 748,399

1 Claim. (Cl. 285—86)

This invention relates to pipe fittings and more particularly to self-flaring fittings wherein the ductile metal pipe or tubing is automatically flared when the fitting is made up.

It has been the practice heretofore when coupling such pipe or tubing to parts of machines or other apparatus to use special tools to pre-flare the end of the pipe or assemble various parts of the fitting on the pipe before making the connection. This required considerable time especially when many connections were to be made. Also after the connections were made up if leaks developed a new fitting had to be used with the consequent loss of the first fitting used. These fittings when once used were not suitable for re-use because of their fragile construction or permanent distortion of their parts.

However the difficulties above referred to have been solved by the present invention by providing an improved self-flaring fitting where the pipe is merely inserted into the fitting as far as it will go and a coupling member turned to cause the pipe to flare and be seated in the fitting to provide a positive, leak-proof connection.

An object of this invention is to provide a self-flaring fitting wherein the force required to make up the flare fitting is reduced to a minimum.

Another object is to provide a self-flaring fitting where the danger of over-wrenching is virtually eliminated, unless it be so excessive as to permanently destroy the fitting.

A further object is to provide a self-flaring fitting that is economical in use and can be used over and over again to flare pipe.

These and other objects which will appear below, are accomplished according to the present invention, by providing a fitting having a body having a recess and a flare-forming projection within the recess, and providing a ferrule which is split and which when forced into the recess squeezes together and grips the pipe so that further advancement of the ferrule carries the pipe forward and causes the pipe to be flared over the projection. The continued forward movement of the ferrule causes the end of the ferrule, which preferably has a beveled seat fitting the flared portion to clamp the flared portion between itself and the flare-forming projection on the body. A draft member having screw-threaded engagement with the body drives the ferrule into the body. Preferably, the draft member and ferrule have cooperating surfaces which are substantially normal to the axis of the pipe so that when the draft member is rotated to advance the ferrule there is no squeezing action between the draft member and the ferrule, and resistance to rotation of the draft member is reduced to a minimum.

By having the ferrule split and having it squeezed together solely by its engagement with the walls of the non-rotating body, the effort required to clamp the ferrule on the pipe and ultimately flare the pipe and clamp it to the body is substantially reduced.

Since the ferrule is split and separate from the draft member, should the connection, when made-up, prove faulty, resulting for instance from improper positioning of the pipe in the fitting at the start of the operation, the ferrule may be spread open by the use of a screw driver slipped back on the pipe, the unsatisfactory flared seat cut off and the pipe may be reflared in the proper manner.

Other features and advantages will hereinafter appear.

In the accompanying drawings:

Figure 1 is a longitudinal section of the fitting with the pipe inserted and prior to flaring and coupling operation.

Fig. 2 is a view similar to Fig. 1 but showing the connection after it has been made-up.

Fig. 3 is a front view of the ferrule.

Fig. 4 is a side elevational view partly in section of the ferrule.

Fig. 5 is a view similar to Fig. 2 but showing the construction when the body member has the male thread and the draft member has the female threads.

As shown in the accompanying drawings, the fitting of the present invention comprises two coupling members 10 and 11 and a separate ferrule 12. The member 10 is provided at one end with a threaded extension 13 adapted to be screwed into a threaded orifice of a passage 14 in supporting structure or other device 15 and has a bore 16 communicating with said passage 14 and extending through the member to a conical flare-forming projection 17 at the other end.

The projection 17 extends into a cavity 18 of an enlarged portion 19 of the member 10 and has its conical surface 17a joined by a narrow wall 20, substantially perpendicular to said surface 17a, to a smooth wall 21 which extends outwardly beyond the end of the projection to the mouth of said cavity and forms therewith an annular recess 22. At the end of the wall 21 the cavity 18 is provided with internal threads 23 for cooperating with corresponding threaded portion of the other member 11.

The member 11 comprises the draft means and has a bore 24 slidably conforming to the outside diameter of a length of ductile pipe 25 which is to be coupled to member 10. The member 11 has external threads 26 adapted to cooperate with the internal threads 23 of the member 10 and a rear portion comprising a nut portion 27 of a hexagonal shape to be engaged by a wrench.

In the form of the invention at present preferred the fitting is provided with the separate ferrule 12 to grip the pipe in making the flared connection. As shown in Figs. 3 and 4 the ferrule 12 comprises a collar or ring 28 split by a longitudinal slot 29 and adapted to have its bore slidably fitting the pipe 25. The forward end of the ring 28 has a conical inner surface 30, corresponding to the taper of the surface 17a of the conical projection 17. The rear end of the ring 28 is provided with a flat surface 31, substantially perpendicular to the longitudinal axis of the ring and adapted to be engaged by a similar flat surface 32 at the forward end of the member 11, for reasons which will be later explained.

The members 10 and 11 and the ferrule 28 comprising the fitting are assembled before pipe is inserted in the fitting, the ring 28 being placed in the cavity 18 and the member 11 screwed therein until the flat surfaces 31 and 32 engage to bring the forward end of the ring into contact with the mouth of the recess 22. By reason of the fact that the ring 28 fits not too loosely in the threaded cavity of the body and that the flat surfaces 31 and 32 of the ring 28 engage, the ring will always be centered with respect to the longitudinal axis of the fitting. Thus the assembly of parts may be made before shipment.

Since the projection 17, ring 28 and the bore 24 are held in alignment in making-up the connection the pipe is merely inserted into the fitting through the member 11 until the forward end of the pipe engages the conical surface 17a of the projection 17. As the member 11 is screwed into the member 10 the ring 28, having its front contacting edge chamfered at 28a enters and moves into the recess 22. The movement, according to the present invention caused the rings to be squeezed together to grip the pipe. For this purpose the wall of the recess 22 and the outer surface of the ring are inclined relative to each other to produce a wedging action. As shown the wall 21 of the recess 22 is tapered so that when the ring 28 enters the annular recess 22, the forward edge of the ring 28 is compressed and grips the pipe 25 near its forward end. Since the ring 28 is separate and free from the member 11 there is no tendency for it to turn and thus twist the pipe 25 during this action as the surface 32 will slidably engage the surface 31 on the ring 28. After the initial gripping of the pipe 25 by the ring 28, continued rotation of the member 11 will force the pipe 25 and ring 28 ahead causing the ring 28 to further grip the pipe 25 at the same time that the end of the pipe is carried forward and forced to flare over the conical projection 17. This continues until the forward end of the ring 28, and its conical surface 30 corresponding to the taper of the surface 17a of the projection 17, engages the flare 34 and clamps it to the projection under longitudinal pressure in leak-proof engagement.

The important advantage of this fitting is that the forces holding the flared pipe and the fitting are all longitudinal forces as distinguished from radial or compression forces, for, with the ring 28 and member 11 having flat engaging surfaces 31 and 32, the forces applied to the ring 28 are all axial and thus the ring is not dependent on the pipe 25 to support it against collapsing.

By having the ring 28 split rather than solid it can be made thick and strong and yet be compressible, for a solid ring to be squeezed against the pipe 25 must be thin and relatively weak. With the provision of a heavy ring 28 it is possible to apply considerably more force to the flare without damage to the ring thus providing a more positive and leakproof connection.

The flared pipe may be easily removed for inspection of the flare, if desired, by merely unscrewing the member 11 and pulling the pipe out of annular recess 22 which has its two surfaces tapered as at 17a and 21 thus facilitating said withdrawal.

The fitting which is made of rugged construction can be used over and over again to flare pipe. After the flared pipe is removed from the member 10, if it is to be shortened or a new flare is desired, it is merely necessary to spring the ring open with a screw driver, slide the ring 28 back on the pipe 25, cut off the first flare and then make the next flare as described above.

The taper in the wall 21 or on the ring 28 acts to bring pipe having a large internal diameter to the size of the conical projection 17. This situation exists when steel pipe is used with a fitting that is intended for copper pipe as the internal diameter of the copper pipe is smaller than for the steel pipe. Also the control of the amount of squeeze on the pipe may be varied by increasing or decreasing the width of the slot on the ring 28.

As shown in Fig. 5 the draft member may be in the form of a nut 11a while the body member is in the form of a plug 10a, which is the reverse of the arrangement shown in Fig. 2. Nevertheless the operations of the body and draft member and the ferrule are the same and one form or the other may be used depending on whether the body is to have an external or internal threaded surface.

Variations and modifications may be made within the scope of this invention and portions of the improvements may be used without others.

I claim:

A pipe connector comprising a body member having a projection having a flare-forming surface, an axially extending wall surrounding said projection and with the latter providing a flare-receiving recess of determinate size to contain the flared pipe and the hereinafter mentioned sleeve, said recess extending axially beyond said flare-forming surface of the projection a determinate distance dependent upon the amount of pipe to be flared and being tapered axially toward the flare-forming surface, a draft member threaded to said body member, an axially split sleeve joined to the draft member for advancement therewith, said sleeve having a bore of greater diameter than the smallest diameter of said projection to freely pass a pipe therethrough to abut said flare-forming surface of the projection, said sleeve having an end portion, the outer diameter of which exceeds the diameter of the recess so that the end portion of the sleeve engages the tapering wall at the outer end of the recess, whereby threading of the draft member upon said body causes the sleeve to advance into said recess to be closed on and compressed into clamping engagement with the pipe at a place thereon spaced a distance from the pipe end dependent upon said determinate distance to extrude said pipe along the flare-forming surface of the projection and substantially fill said recess to form a leak-tight joint with said pipe.

STEPHEN GUARNASCHELLI.

REFERENCES CITED

The following references are of record in the file of this patent:

UNITED STATES PATENTS

| Number | Name | Date |
|---|---|---|
| 406,060 | Potts | July 2, 1889 |
| 1,755,210 | Dohner | Apr. 22, 1930 |
| 1,982,533 | Parker | Nov. 27, 1934 |
| 2,090,266 | Parker | Aug. 17, 1937 |
| 2,112,239 | Guarnaschelli | Mar. 29, 1938 |
| 2,271,502 | Snyder | Jan. 27, 1942 |
| 2,316,806 | Parker | Apr. 20, 1943 |
| 2,320,812 | Cowles | June 1, 1943 |
| 2,443,187 | Hobbs | June 15, 1948 |
| 2,466,057 | Somma | Apr. 15, 1949 |

FOREIGN PATENTS

| Number | Country | Date |
|---|---|---|
| 569,953 | France | Apr. 22, 1924 |
| 397,670 | Great Britain | Aug. 31, 1933 |